(12) United States Patent
Jones et al.

(10) Patent No.: US 8,592,749 B2
(45) Date of Patent: Nov. 26, 2013

(54) AUTO CALIBRATION TECHNIQUE FOR RADIATION DETECTORS

(75) Inventors: Morgan Jones, Reading (GB); Graham Auld, Reading (GB)

(73) Assignee: The Secretary of State for Defence (GB)

( * ) Notice: Subject to any disclaimer, the term of this patent is extended or adjusted under 35 U.S.C. 154(b) by 190 days.

(21) Appl. No.: 12/993,505

(22) PCT Filed: May 18, 2009

(86) PCT No.: PCT/GB2009/001244
§ 371 (c)(1),
(2), (4) Date: Dec. 29, 2010

(87) PCT Pub. No.: WO2009/141596
PCT Pub. Date: Nov. 26, 2009

(65) Prior Publication Data
US 2011/0108718 A1 May 12, 2011

(30) Foreign Application Priority Data

May 21, 2008 (GB) .................................. 0809198.5

(51) Int. Cl.
*G01D 18/00* (2006.01)
*G01T 1/00* (2006.01)
(52) U.S. Cl.
USPC .................................... 250/252.1; 250/336.1

(58) Field of Classification Search
USPC .............................. 250/252, 1, 370.06, 336.1
See application file for complete search history.

(56) References Cited

U.S. PATENT DOCUMENTS

| | | | |
|---|---|---|---|
| 4,577,338 A | | 3/1986 | Takahashi et al. |
| 5,023,449 A | * | 6/1991 | Holenka et al. ............. 250/252.1 |
| 5,475,727 A | | 12/1995 | Buchanan et al. |
| 5,489,775 A | | 2/1996 | Viera |
| 7,462,837 B2 | * | 12/2008 | Russ ............................. 250/395 |

FOREIGN PATENT DOCUMENTS

| | | |
|---|---|---|
| AT | 349583 | 4/1979 |
| DE | 2641476 | 3/1978 |
| EP | 0621494 | 10/1994 |
| GB | 1226924 | 3/1971 |
| GB | 2409035 | 6/2005 |
| JP | 2003344547 | 12/2003 |

* cited by examiner

*Primary Examiner* — David Porta
*Assistant Examiner* — Faye Boosalis
(74) *Attorney, Agent, or Firm* — Dean W. Russell; Kilpatrick Townsend & Stockton LLP

(57) ABSTRACT

An apparatus and a method for calibrating a source detection device. The apparatus comprises a detector having a known amplification gain, a count rate meter, a means of measuring peak energy of a detected particle, a means of counting the number of particles detected at a given energy range and a means of comparing the number of particles counted over an energy range with an expected value. The apparatus adjusts the gain to cause the measured spectrum to correspond with an expected spectrum.

2 Claims, 2 Drawing Sheets

US 8,592,749 B2

AUTO CALIBRATION TECHNIQUE FOR RADIATION DETECTORS

CROSS REFERENCE TO RELATED APPLICATIONS

Figure 1:
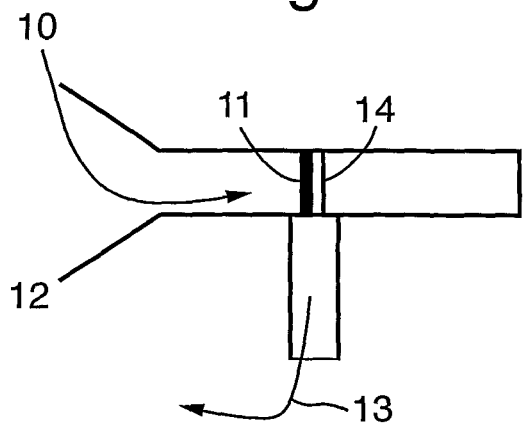

This application is the U.S. national phase of International Application No. PCT/GB2009/001244 filed on May 18, 2009 and published in English on Nov. 26, 2009 as International Publication No. WO 2009/141596 A2, which application claims priority to Great Britain Patent Application No. 0809198.5 filed on May 21, 2008, the contents of both of which are incorporated herein by reference.

This invention relates to automatic calibration of devices for measuring signals having a known characteristic spectrum, and in particular, alpha in-air monitors.

Installations such as nuclear facilities and laboratories handling alpha-emitting radionuclides have a requirement to detect alpha particles in the air and thereby identify the emitting nuclide as quickly and as accurately as possible. Such early indications enable the appropriate response in the most timely manner to minimise the effects of any radiation release to the workforce and the general public.

Alpha in-air monitors are well understood. In general, air is drawn into the detector and through a filter screen on which the particles are deposited and beyond the screen a detector measures the incident radiation and triggers an alarm as the system demands.

Any system measuring radiation and required to produce an energy spectrum needs to be calibrated against a source of known energy. If the monitor is not properly calibrated, it is possible that it fails to activate an alarm at the correct time. Typically, to calibrate a detector a source with a strong peak of a known energy (for example 5.156 MeV for $^{239}$Pu) is placed in front of the detector and system gain is adjusted until the measured peak energy corresponds to the expected peak energy for that detector and calibration source. The spectrum energy axis is usually digitised into discrete channels or bins so that each channel counts the number of events that fall into its energy window. Thus, we would expect the $^{239}$Pu source to produce a large number of counts in the 5.156 MeV channel.

However, there are various factors that cause the theoretical energy to spread across a number of channels. For example, in a detector in which air is drawn through a filter paper, a gap is necessary between the filter paper which traps the radiation-emitting particles and the detector. As the detector head and the filter paper are of a certain dimension, this gap allows for many different paths for radiation such as an alpha particle to travel through between the two. As the energy of an alpha particle is rapidly attenuated in air, it is clear that there will be a range of energies of particles arriving at the detector head.

Also, because emission of radiation is a random process, when sampled over a finite time it could even happen that the spread peak might not even be centred on the correct channel. If the counting is continued for long enough, the peak will be centred on the correct channel. Since in the current art it normally needs a human present to make gain adjustments and measurement, a sufficient time might be ten minutes or more before sufficient counts are taken. Typically it might require six complete measurements to properly calibrate a device.

Thus there may be a temptation to cut the calibration process short, leading to inaccurate readings etc. In any event a typical nuclear licensed facility might have in the order of 200-1000 such detectors, and each one must be calibrated regularly. This leads to a lot of time being spent on a costly but necessary process. It would be advantageous to make the calibration process quicker whilst maintaining or enhancing its accuracy to reduce costs.

Accordingly the present invention provides for an apparatus for calibrating a source detection device, comprising a detector having a known amplification gain, a count rate meter, a means of measuring peak energy of a detected particle, a means of counting the number of particles detected at a given energy range and a means of comparing the number of particles counted over an energy range with an expected value, characterised in that the gain may be adjusted to cause the measured spectrum to correspond with the expected spectrum.

Such an apparatus allows the peak count to be accurately detected for a much lower total count rate. By measuring the spectrum and producing a curve, the shape of the curve becomes important rather than the peak count, so that a greater number of emitted particles contribute to the calibration. In this method, now only two measurements are required to achieve calibration. A first to calibrate and a second to check that the calibration was successful. The technique uses the fact that in-air monitoring of alpha particles causes a predictable spread of energies and the shape of the measured spectrum can be used to assist in determining where the peak should be.

The method relies upon approximating the peak energy (which equates to the shortest air path) and then using this to calculate the approximate offset needed to move the curve, and then by comparing this to the expected curve, confirming that the peak was correctly established. The curve is produced by counting the number of particles in the energy bins. Once the initial offset has been estimated, the area under the curve between two points chosen to be representative for a given source can be calculated for the new offset value, and compared to what it should be. Because this uses lower energy particles rather than discarding them, it is a more efficient use of the available data.

Whilst the technology here has been directed towards alpha particle detection, it is clear that the technique could be used for any source in which particles arrive at the detector in discrete energies so as to form a spectrum. The system particularly lends itself to ionising radiation in which the spectrum created has a low energy tail on the peak.

Although currently calibration is achieved using a laptop computer connected to the detector, it would be possible to have remote or self calibration on a very regular basis to remove the need for human intervention entirely, leading to cost savings and reduced on site dose uptake of key personnel. It is possible to fully automate the system by employing a carousel containing the filter papers that can be remotely replaced so that only very infrequent visits are needed. The system could be fully automated to either electronically request recalibration or even recharging of a depleted carousel.

The invention will now be described in more detail with reference to the following drawings. The description focuses on a particular source, in this case $^{239}$Pu, although it will be appreciated that any suitable emitter could be chosen.

Figure 2:
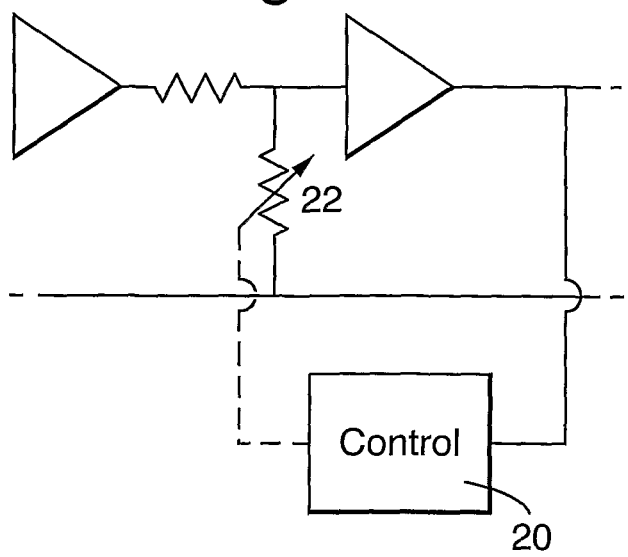
Figure 3:
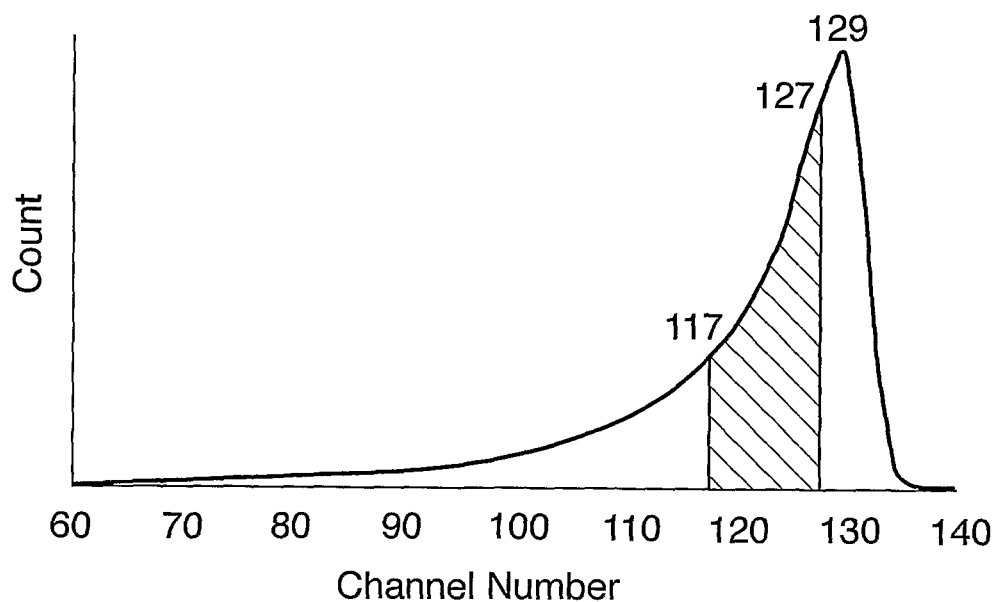

FIG. 1 shows the set up of an alpha in air monitor
FIG. 2 shows the apparatus schematically
FIG. 3 shows a typical curve with the energy distributed in several 'bins'.

In FIG. 1, a particle of $^{239}$Pu (10) is drawn into the device (12) by using a fan (13) and is deposited on a porous screen (11). On decay, the direction of the radiation by chance is towards the detector (14), but as it might not take the shortest path it dissipates some of its energy before capture.

It is assumed that a nominal 200Bq $^{239}$Pu source is used for calibration and events are counted until a total count of 3680 (230×16) is reached. In the present example, the factor of 230 is chosen because it results in convenient numbers for the calculations, and 16 is a scaling factor that allows a sufficiently large count of random events to reduce the spread to an acceptable level. Although a larger count will improve accuracy, the standard deviation of a Poisson distribution is equal to the square root of the count, so halving the error would require the count to be quadrupled, increasing the calibration time from about 92 s to about 368 s (or six minutes).

The reason for counting to a specific total count rather than for a specific time is that the shape of the expected spectrum is known, so if the area under the spectrum curve between two points is precisely known, amplitudes of individual channels can be predicted and tested against measurement. Further, by measuring the number of counts, the method becomes independent of source strength. In FIG. 2 the fact that an event has happened is counted. The detected peak energy of the event is measured and the count rate for the bin containing that energy is increased by one.

Once a counter records that the required number of counts has been achieved, the apparatus begins calibration. The algorithm works in two stages, one coarse, one fine:

First, the channel with the maximum number of counts is determined. If correctly calibrated, the maximum number of counts should occur in this example in Channel 129. If, for example, the maximum number of counts is found in Channel 120, then the peak offset is 9 channels and the algorithm adds 9 to all channel addresses so that the original Channel 120 becomes Channel 129.

Since random processes measured over finite times are not quite so accommodating as to reliably put the peak count in the expected channel, the second step, as shown in FIG. 3, is that the algorithm sums the counts between Channel 117 and Channel 127 inclusive. If the peak channel is in the correct position, the total area of these channels should be 100×16 (this is why the total count used is 230×16). Experience has shown that for 230 counts, 100 would fall between these energy bins. This curve, naturally, is dependent on the geometry of the detector and the nature of the calibration source. If the peak channel has been incorrectly determined, the total area of these channels will be incorrect and can be used to modify the peak offset.

An area of 100 results in no fine gain modification, but an area of 95 would cause the gain to be dropped by one step, and an area of 117 would increase gain by two steps. Modification of gain by more than two steps is not allowed because this implies that rather than looking between Channel 117 and Channel 127, the area algorithm is looking as far as Channel 115 or Channel 129, with the danger that it is looking beyond the peak or at low counts, rendering the data Treated Unusable (TU). This is summarised in Table 1 below. In practice, it is comparatively rare for a two step fine gain modification to be needed. Once the fine gain modification has been found, it is added to the peak offset and this total value is applied directly to the analogue auto-calibration attenuator.

FIG. 2 shows how the gain may be adjusted. The control mechanism (20) employs the method according to the invention in order to determine the gain adjustment required. The gain is trivially simple to adjust by the adjustment of variable resistor (22), although it will be appreciated by a person skilled in the art that there are many ways of achieving the correct gain adjustment.

TABLE 1

| Gain step | TU | −2 | −1 | 0 | +1 | +2 | TU |
|---|---|---|---|---|---|---|---|
| Ch117-Ch127 area | 74 | 81 | 90 | 100 | 111 | 123 | 136 |
| Switching point | 77 | 86 | 95 | | 105 | 117 | 130 |

The invention claimed is:

1. An apparatus for calibrating an alpha source detection device, comprising a detector having a known amplification gain, a count rate meter, a means of measuring the energy of a detected particle, a means of counting the number of particles detected at a given energy range and a means of comparing the number of particles counted over an energy range with an expected value, wherein the apparatus counts a predetermined number of counts to create a measured spectrum and the amplification gain may be adjusted to cause the measured spectrum to correspond with an expected spectrum.

2. A method of calibrating an alpha source detection device having a known amplification gain, comprising the steps of:
   detecting a predetermined number of events at the detection device,
   measuring the energy of each of the events and recording the event in one of a plurality of energy bins,
   establishing a curve of counts against energy bins to produce a spectrum,
   calculating the area under the curve between one point corresponding to a first energy bin and a second point corresponding to a second energy bin,
   comparing said area with an area calculated at the same energy bin values derived from a known calibration curve, and
   modifying the gain of the detection device to map the measured spectrum onto the spectrum derived from the known calibration curve.

\* \* \* \* \*